United States Patent [19]

Kaburagi et al.

[11] Patent Number: 5,294,105
[45] Date of Patent: Mar. 15, 1994

[54] SHEET FEEDING APPARATUS WITH AN ELEVATION TYPE BASE PLATE

[75] Inventors: Mitsuo Kaburagi; Yasuhiro Matsui, both of Hachioji, Japan

[73] Assignee: Konica Corporation, Tokyo, Japan

[21] Appl. No.: 21,359

[22] Filed: Feb. 23, 1993

[30] Foreign Application Priority Data

Mar. 4, 1992 [JP] Japan .................... 4-047146

[51] Int. Cl.$^5$ .................................................. B65H 1/26
[52] U.S. Cl. ........................................ 271/157; 271/147
[58] Field of Search ............... 271/22, 24, 30.1, 128, 271/147, 157, 160

[56] References Cited

U.S. PATENT DOCUMENTS

| | | | |
|---|---|---|---|
| 2,833,540 | 5/1958 | Koch | 271/157 |
| 5,150,893 | 9/1992 | Uno et al. | 271/157 |
| 5,201,509 | 4/1993 | Kirchhoff et al. | 271/157 |

FOREIGN PATENT DOCUMENTS

| | | | |
|---|---|---|---|
| 1152114 | 8/1963 | Fed. Rep. of Germany | 271/147 |
| 0006845 | 1/1983 | Japan | 271/147 |
| 0051421 | 3/1986 | Japan | 271/147 |
| 0074826 | 4/1988 | Japan | 271/157 |
| 0295326 | 12/1988 | Japan | 271/157 |
| 0017722 | 1/1989 | Japan | 271/157 |
| 0022733 | 1/1989 | Japan | 271/157 |
| 0231735 | 9/1989 | Japan | 271/147 |
| 0674977 | 8/1990 | Japan | 271/147 |
| 4-023742 | 1/1992 | Japan | 271/147 |
| 4-094337 | 3/1992 | Japan | 271/147 |

Primary Examiner—H. Grant Skaggs
Assistant Examiner—Carol Lynn Druzbick
Attorney, Agent, or Firm—Frishauf, Holtz, Goodman & Woodward

[57] ABSTRACT

A recording sheet feeding apparatus comprises a tray frame with four vertical walls which surround an inner space, a stacking plate which is movable in the vertical direction within the inner space guided by the vertical walls, a winding roller for moving the stacking plate through a mechanical transmission which converts a rotation of the winding roller to the vertical movement of the stacking plate and a counterweight means for lifting up the stacking plate by applying a counterweight torque to the winding roller in accordance with the rotation angle thereof.

4 Claims, 2 Drawing Sheets under 5,294,105

SHEET FEEDING APPARATUS WITH AN ELEVATION TYPE BASE PLATE

BACKGROUND OF THE INVENTION

The present invention relates to an improvement of a sheet feeding apparatus in an image recording apparatus. More particularly, the present invention relates to an improvement, of a driving means for an elevation type sheet feed base plate.

In an image recording apparatus such as a copying apparatus, recording sheets of various types are respectively loaded in exclusive sheet feed cassettes, the cassettes are loaded into the image recording apparatus and recording sheets of a desired size can be fed one by one.

However, the amount of recording sheets which can be loaded in the above cassettes, is not so large, about 200 sheets at the most. Therefore, every time the sheets are used up, the cassette must be detached from the image recording apparatus so that the recording sheets can be loaded into the cassette, and loaded again into the image recording apparatus. Accordingly, when the foregoing detaching from and loading into the apparatus is frequently carried out, it is troublesome and the recording efficiency is lowered.

In order to avoid such problems, a sheet feeding apparatus provided with an elevation type sheet feed base plate is widely used in which a larger amount of recording sheets, which are frequently used as a main size, can be stored.

As the sheet feeding apparatus described above, the apparatus which has been disclosed in Japanese Utility Model Open to Public Inspection No. 180637/1988, is widely known.

In the sheet feeding apparatus provided with the elevation type sheet feed base plate in which a large amount of recording sheets can be stored, an apparatus having a storage capacity of more than 500 sheets has now been realized. However, a sheet feeding apparatus having a storage capacity in which 1000, or 1500 recording sheets can be stored, is required to be realized.

However, in order to load such a large amount of sheets onto the sheet feed base plate and to elevate it freely, large driving power is necessary. That is, large output power of a driving motor is necessary, which is beyond that used in an ordinary office. Further, the loading operation of the recording sheets onto the elevation base plate is inevitably troublesome.

SUMMARY OF THE INVENTION

The object of the present invention is to solve the foregoing problems and to provide a sheet feeding apparatus with an elevation type sheet feed base plate.

The object can be accomplished by the following technical means (a) to (d).

(a) A recording sheet feeding apparatus for use in an image forming apparatus, comprising:

a tray frame having four vertical walls to surround an inner space;

four slit portions provided two by two in two opposite walls of the four vertical walls, each slit portion having a slit in the vertical direction;

a stacking plate provided in the inner space, for mounting thereon a stack of recording sheets, the stacking plate being movable in the vertical direction guided by the four vertical walls;

four protruded portions provided two by two in two opposite sides of the stacking plate, each protruded portion being protruded outside of the tray frame through a respective one of the slits;

four idling wheels, each mounted on the tray frame above a respective one of the slit portions;

a winding roller mounted on the two opposite walls of the tray frame;

four transmission wires for transmission of displacement between the winding roller and the stacking plate, wherein each transmission wire is connected with one end thereof to the peripheral surface of the winding roller, is wound around the winding roller, passes through at least one of the idling wheels and is connected with the other end of the transmission wire to a respective one of the protruded portions, so that the four transmission wires suspend the stacking plate in a horizontal disposition from the four idling wheels; and balancing means for applying a counterweight torque to the winding roller, the counterweight torque corresponding in amount to a rotation angle of the winding roller and counteracting the weight of the stacking plate and the stack of recording sheets through the transmission means, wherein the balancing means comprises;

a wire wound around the winding roller, one end of the wire being connected to a peripheral surface of the winding roller, and spring means connected between the tray frame and the other end of the wire, for pulling the wire with a force which corresponds in amount to a rotation angle of the winding roller.

(b) The recording sheet feeding apparatus of claim 1, wherein the spring means comprises:

a hook plate slidably provided to the cassette frame;

a first spring connected between the cassette frame and the hook plate; and a second spring connected between the hook plate and the other end of the wire.

(c) The recording sheet feeding apparatus of claim 1, wherein the tray frame is detachably provided to the image forming apparatus;

the winding roller is connected to a driving shaft of the image forming apparatus through a transmission coupling when the recording sheet feeding apparatus is attached to the image forming apparatus; and the winding roller becomes free from the driving shaft by a disconnection of the transmission coupling when the tray frame is detached from the image forming apparatus.

(d) The recording sheet feeding apparatus of claim 1, wherein the balancing means keeps the top surface of the stack of recording sheets at a constant position in the vertical direction regardless of a change of the number of recording sheets in the stack by selecting a spring constant of the spring means.

DETAILED DESCRIPTION OF PREFERRED EMBODIMENT

Figure 1:
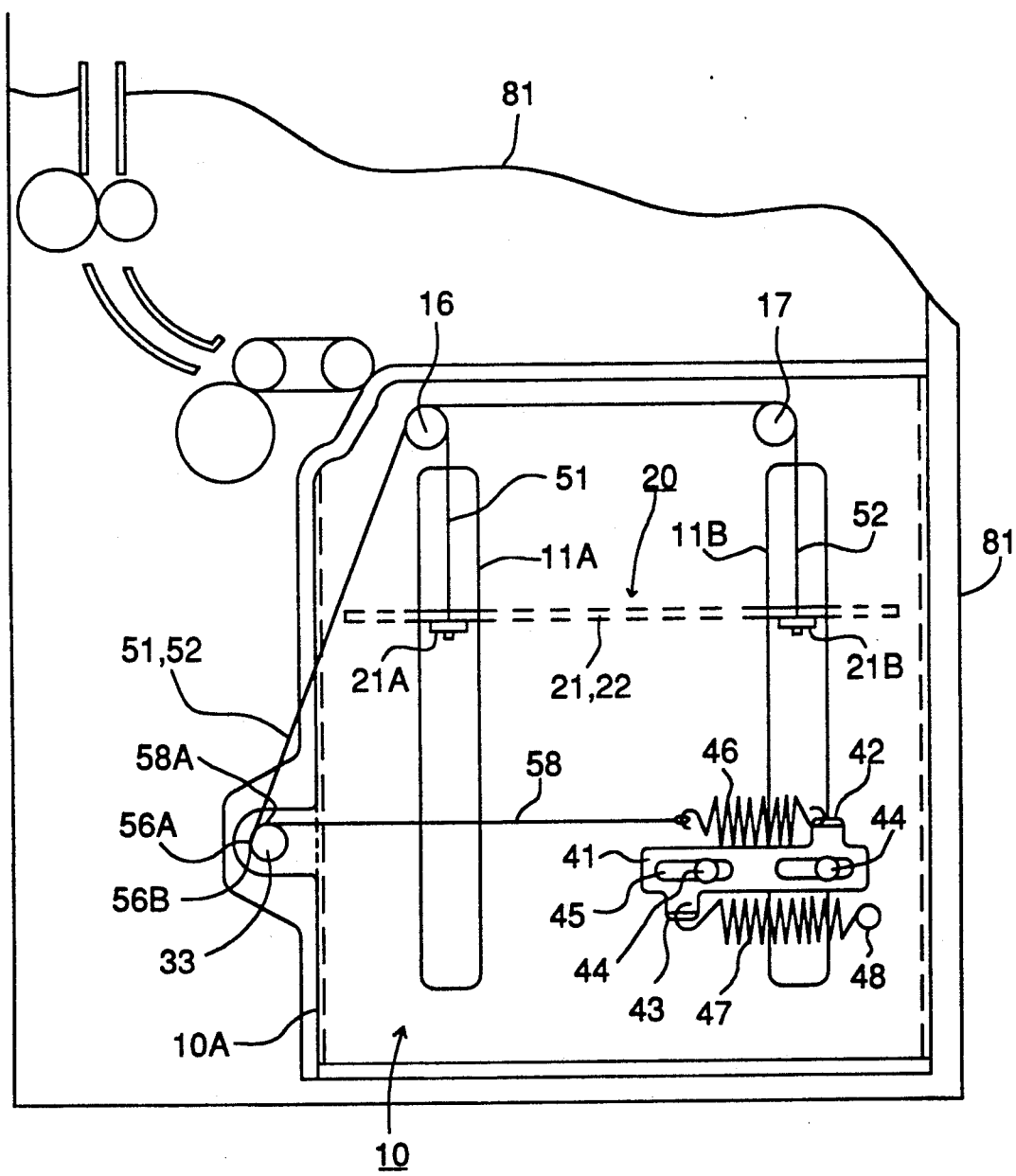
FIG. 1 is a rear view of a sheet feeding apparatus of the present invention.

Referring to the rear view in FIG. 1 and the plan view in FIG. 2, an embodiment of the present invention will be described as follows. A tray frame 10A of a sheet feeding apparatus main body 10 is structured by four walls 11, 12, 13 and 14, the inside walls of which are formed to be guide walls. Accordingly, a stacking plate 20 is moved up and down along inside wall surfaces of four walls 11, 12, 13 and 14.

The stacking plate 20 is a plate with four sides 21, 22, 23 and 24. Four protruded portions 21A, 21B, 22A and 22B are provided in symmetrical positions, that is, balanced positions, on two opposing sides of the plate. Cables 51, 52, 53 and 54 are connected with the protruded portions. Pulleys 16, 17, 18 and 19 are rotatably supported on the outside of walls 11 and 12 positioned just above the protruded portions 21A, 21B, 22A and 22B. A winding roller 33 is rotatably provided on the lower portion of opposite walls 11 and 12 of the tray frame 10A, and passes through the walls 11 and 12. The driving shaft is detachably connected with a driving unit 30. The other ends of the four cables are connected with connecting points 56A, 56B, 57A and 57B on the driving shaft 33 through idling wheels 16, 17, 18 and 19. A spring hook plate 41 is slidably provided in parallel with the outer surface of either one (the wall 11 in FIGS. 1 and 2) of the walls 11 or 12. The spring hook plate 41 can slide along its sliding holes 45 on two guide pins provided on the wall 11.

A hook at one end of a spring 46 is hooked to a spring hook hole 42, and a hook at the other end of the spring is connected with one end of a cable 58. The other end of the cable is connected with a connecting point 58A on the winding roller 33. A hook at one end of the other spring 47 is hooked to a spring hook hole 43, and a hook at the other end of the spring 47 is hooked on a pin 48 which is fixed on the wall 11. The spring 46 and the spring 47 are urged in opposing directions.

Slit portions 11A, 11B, 12A, and 12B are provided on the walls 11 and 12 so that the protruded portions 21A, 21B, 22A and 22B of the stacking plate 20 can be moved in upper and lower directions.

A coupling pin 36 provided on one end of the winding 33 is coupled to a coupling 35 of a speed reduction shaft of a speed reduction motor 31 provided on a frame 81 of the image recording apparatus main body.

A speed reduction mechanism 32 is structured with two-stage reduction by a worm 38 and a worm wheel 37, which are directly coupled to the motor 31, and a spur gear.

Figure 2:
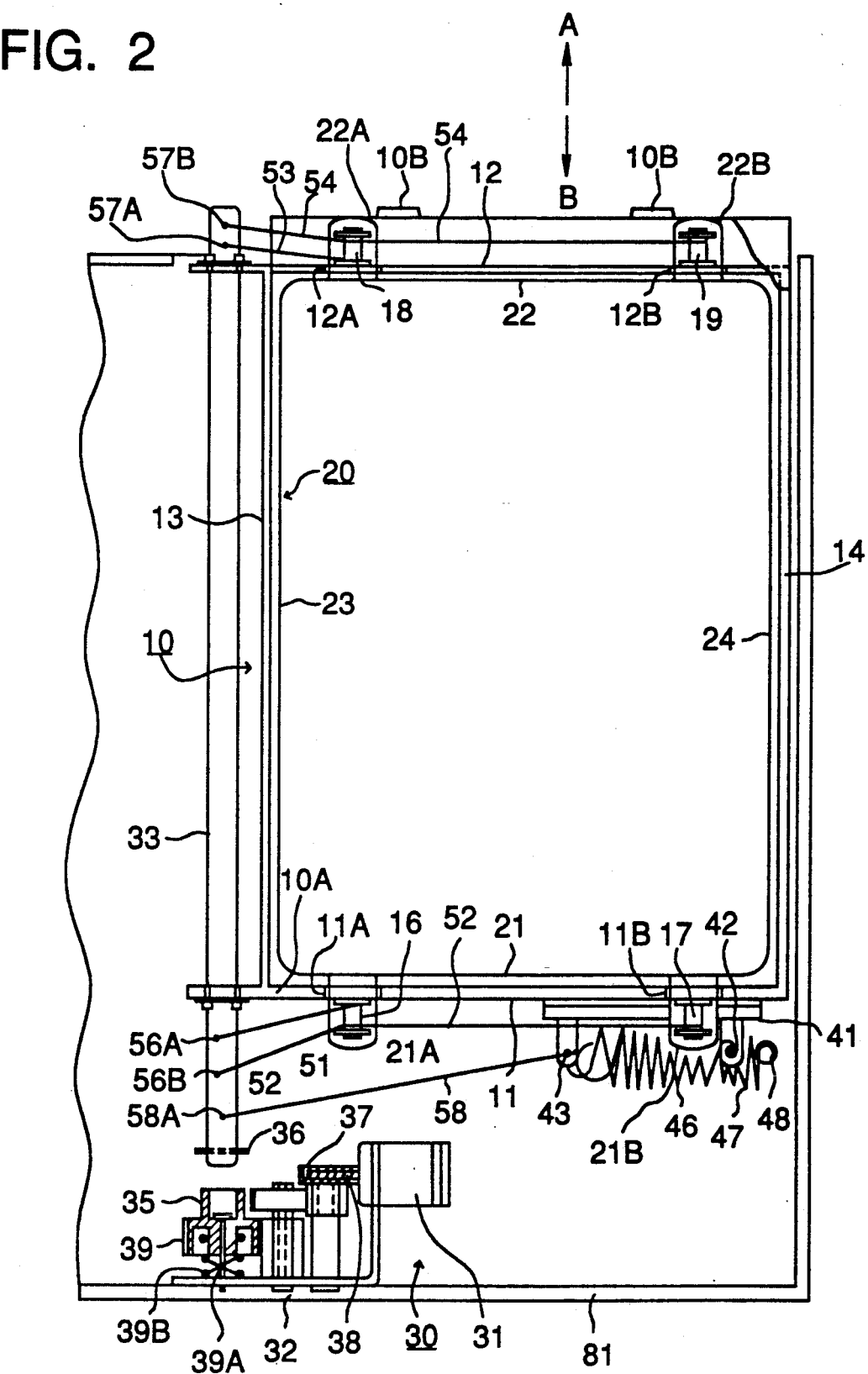
FIG. 2 is a plan view of the sheet feeding apparatus of the present invention.

When the sheet feeding apparatus 10 is pulled out by knobs 10B from the frame 81 of the image recording apparatus main body along a guide rail (not shown in the drawings) in the direction of arrowed line A in FIG. 2, the coupling pin 36 is disengaged from the coupling 35 of the driving unit 30. Then, when recording sheets are stacked on the sheet feed base plate 20 and the sheet feeding unit 10 is pushed in the arrowed direction B in FIG. 2, that is, the sheet feeding unit 10 is set to the frame 81 of the image recording apparatus main body, the coupling pin 36 at the tip of the driving shaft 33 is coupled to the coupling 35 of the speed reduction shaft which is concentrically provided to a final reduction gear 39 of the speed reduction mechanism 32, and the driving force can be transmitted.

The reduction gear 39 is integrally provided with the coupling 35, and can be freely rotated around a shaft 39A. They can be cushioned in the thrust direction through a spring 39B so that the coupling pin 36 can be smoothly coupled to the coupling 35. FIG. 2 shows the condition in which the sheet feeding apparatus 10 is being pushed into the frame 81 of the image recording apparatus main body, and shows the condition just before the coupling pin 36 is coupled to the coupling 35.

Next, the stacking operation of recording sheets onto the sheet feed base plate 20 of the present invention will be described as follows.

When the sheet feed base plate 20 is pulled out from the frame 81 of the image recording apparatus main body by the knobs 10B in the arrowed direction A in FIG. 2, the sheet feed base plate 20 is lowered to a position at which just 500 recording sheets (A4 size) can be stacked, and is ready for the next operation. When 500 recording sheets are loaded, the uppermost recording sheet is positioned about 11 mm below a sheet conveyance level which is suitable for feeding out the recording sheet.

Further, when another 500 recording sheets are stacked (total 1000 sheets) on the sheet feed base plate 20, the base plate 20 is further lowered, and the uppermost recording sheet is positioned about 11 mm below the recording sheet conveyance level in the same way as the foregoing.

Further, when another 500 recording sheets are stacked (total 1500 sheets) on the sheet feed base plate 20, the base plate 20 is further lowered, and the uppermost recording sheet is positioned about 10 mm below the recording sheet conveyance level.

When the number of stacked sheets is between 500 and 1000 sheets, or between 1000 and 1500 sheets, the uppermost sheet is always kept in a position within the range of 6 to 11 mm below the sheet conveyance level. When the sheet feeding apparatus is pushed to the frame 81 of the image recording apparatus main body in the arrowed direction B in FIG. 2 so that it can be equipped into the image recording apparatus main body, under the condition in which recording sheets are stacked on the stacking plate 20 in a well balanced condition as described above, the uppermost sheet does not touch parts for sheet conveyance, and thereby no turning-over, damage or crumpling of sheet can be caused, so that stable equipping of the sheet feeding apparatus into the image recording apparatus main body can be completed. Therefore, the subsequent sheet feed driving and image recording operations can be smoothly and stably carried out.

Before feeding the recording sheet from the sheet feed base plate, the sheet feed base plate travels upward for the above mentioned 6 to 11 mm to the sheet conveyance level by a drive from the winding roller 33. The winding roller rotates at a very slow speed driven by an output shaft of a speed reduction unit which is provided in the main body of the image recording apparatus. At the same time to the travel of the sheet feed base plate, a level detector (not shown in the drawings) to detect a vertical position of the sheet feed base plate is also driven.

Necessary energy for moving the sheet base plate to the conveyance level is very small because the travel distance of the sheet feed base plate is only 6 to 11 mm. The situation is the same for driving energy to drive the level detector. Necessary time for the above travel of the stacking plate is only about 0.3 seconds in spite of the slow speed in the travel because both the distance of the travel and the necessary energy are small.

In the same way, the amount of rotation of the driving shaft generated by the level control during the conveyance operation of more than 500 sheets is very small, and therefore, the power consumption of the driving motor is very small. Accordingly, even when the required power of the motor 31 used for the apparatus is very small, it can tolerate the weight because the power is transmitted through the reduction mechanism having a reduction ratio of about 1/200. Therefore, according to the present invention, the image recording apparatus can be smoothly operated by the limited rated power.

Further, a skilled operator is not necessary because the apparatus can be easily operated.

When the last sheet is fed and the sheet feed base plate is empty, the sheet feeding apparatus 10 is pulled out from the frame 81 of the image recording apparatus main body and sheets are stacked thereon by the following operations. The coupling pin 36 provided on the tip of the winding roller 33 is disengaged from the coupling 35 provided on the final reduction shaft of the reduction mechanism 32 of the motor 31. Thereby, the function as a stopper through the reduction mechanism 32 is released. The sheet feed base plate 20, which is positioned at the uppermost stage, is lowered by a spring 46 to the position in which the sheet feed base plate can be ready for loading 500 recording sheets. Accordingly, the uppermost recording sheet can be positioned in the position very close to the sheet conveyance level, as described above, by stacking more than 500 sheets on the sheet feed base plate 20, and therefore, the coupling pin 36 provided on the tip of the winding roller 33 can be coupled to the coupling 35 simply by pushing the sheet feeding apparatus 10 into the frame 81 of the image recording apparatus main body for setting the apparatus 10 thereto. A starting switch is automatically turned on under the above-described condition, and the rising operation of 6 to 11 mm is completed in about 0.3 seconds, and thus the recording sheet loading operation is completed.

Further, when 1500 recording sheets (maximum) are loaded on the sheet feed base plate 20, the sheet feed base plate 20 is positioned in the manner that the uppermost recording sheet is positioned 6 to 11 mm below the conveyance level surface, and the loading operation of the recording sheets is completed while the base plate 20 is being kept to have so enough space that it does not touch the lower portion of the sheet feeding apparatus 10. Therefore, when the sheet feeding apparatus 10 is pushed into the frame 81 of the image recording apparatus main body, the lower portion thereof is not dragged, and cables 51, 52, 53, 54, and 58 are not loosened.

The above-described spring 47 is a spring to prevent cable disconnection when the elevated base plate is positioned in the lowest position.

According to the sheet feeding apparatus of the present invention, a loading operation of a large amount of recording sheets can be completed in a short period of time by a small power motor in a relatively small space. No skilled operation is necessary. In spite of a large amount of sheet, power consumption of the motor is small. Therefore, the sheet feeding apparatus is compact, and the power required for the apparatus can be greatly lowered, with respect to power rating which is limited when the apparatus is installed in an office as an office machine. Accordingly, the apparatus of the present invention can contribute to cost reduction. Further, the apparatus can greatly contribute to commercial spread of high grade image recording apparatuses.

What is claimed is:

1. A recording sheet feeding apparatus for use in an image forming apparatus, comprising:

a tray frame having four vertical walls to surround an inner space;

four slit portions provided two by two in two opposite walls of the four vertical walls, each slit portion having a slit in the vertical direction;

a stacking plate provided in the inner space, for mounting thereon a stack of recording sheets, the stacking plate being movable in the vertical direction guided by the four vertical walls;

four protruded portions provided two by two in two opposite sides of the stacking plate, each protruded portion being protruded outside of the tray frame through a respective one of the slits;

four idling wheels, each mounted on the tray frame above a respective one of the slit portions;

a winding roller mounted on the two opposite walls of the tray frame;

four transmission wires for transmission of displacement between the winding roller and the stacking plate, wherein each transmission wire is connected with one end thereof to the peripheral surface of the winding roller, is wound around the winding roller, passes through at least one of the idling wheels and is connected with the other end of the transmission wire to a respective one of the protruded portions, so that the four transmission wires suspend the stacking plate in a horizontal disposition from the four idling wheels; and balancing means for applying a counterweight torque to the winding roller, the counterweight torque corresponding in amount to a rotation angle of the winding roller and counteracting the weight of the stacking plate and the stack of recording sheets through the transmission means, wherein the balancing means comprises;

a wire wound around the winding roller, one end of the wire being connected to a peripheral surface of the winding roller, and spring means connected between the tray frame and the other end of the wire, for pulling the wire with a force which corresponds in amount to a rotation angle of the winding roller.

2. The recording sheet feeding apparatus of claim 1, wherein the spring means comprises:

a hook plate slidably provided to the tray frame;

a first spring connected between the tray frame and the hook plate; and a second spring connected between the hook plate and the other end of the wire.

3. The recording sheet feeding apparatus of claim 1, wherein the tray frame is detachably provided to the image forming apparatus;

the winding roller is connected to a driving shaft of the image forming apparatus through a transmission coupling when the recording sheet feeding apparatus is attached to the image forming apparatus; and the winding roller becomes free from the driving shaft by a disconnection of the transmission coupling when the tray frame is detached from the image forming apparatus.

4. The recording sheet feeding apparatus of claim 1, wherein the balancing means keeps the top surface of the stack of recording sheets at a constant position in the vertical direction regardless of a change of the number of recording sheets in the stack by selecting a spring constant of the spring means.

* * * * *